United States Patent [19]
Knauf

[11] 3,785,731
[45] Jan. 15, 1974

[54] METHOD AND APPARATUS FOR PRODUCING ORTHOPHOTOPLANS

[75] Inventor: Jack W. Knauf, Fairfax, Va.

[73] Assignee: The United States of America as represented by the Secretary of the Interior, Washington, D.C.

[22] Filed: June 2, 1972

[21] Appl. No.: 259,059

Related U.S. Application Data

[63] Continuation-in-part of Ser. No. 130,739, April 2, 1971, abandoned.

[52] U.S. Cl. .................................. 355/22, 95/12.5
[51] Int. Cl. .................. G03b 27/32, G03b 35/14
[58] Field of Search ................ 355/22; 95/12, 12.5

[56] References Cited
UNITED STATES PATENTS

| | | | |
|---|---|---|---|
| 3,583,809 | 6/1971 | Dubuisson | 355/22 |
| 3,692,406 | 9/1972 | Blachut | 355/22 |
| 3,486,820 | 12/1969 | Blachut | 355/22 |

*Primary Examiner*—Samuel S. Matthews
*Assistant Examiner*—Richard A. Wintercorn
*Attorney*—Gersten Sadowsky and Ernest S. Cohen

[57] ABSTRACT

An orthophotoscope to provide color photomaps obtains a requisite stereoscopic model therein by stereoscopy wherein image separation arises from either filters or operation of a stereoimage alternator system made an integral part thereof. Recording during such system operation is accomplished by exposing photographic film very nearly continuously to light from one of the system projectors directed through a light selective shutter structure, and causing light from the other of the system projectors to be selectively obscured at all times to prevent exposure of the film sheet thereto. Continuous light for recording where filters are used is beamed unfiltered through a small uncovered area of a filter in one of the projectors.

22 Claims, 9 Drawing Figures

PATENTED JAN 15 1974

INVENTOR
JACK W. KNAUF

BY Ernest S. Cohen
Gersten Sadowsky
ATTORNEYS

PATENTED JAN 15 1974

METHOD AND APPARATUS FOR PRODUCING ORTHOPHOTOPLANS

This is a continuation-in-part of application Ser. No. 130,739 filed Apr. 2, 1971 now abandoned.

The invention is in a method of producing orthorepresentations including orthophotographs and orthomaps, in black and white or actual colors, from a stereo-pair of appropriate photographs, and improved photogrammetric apparatus for carrying out the aforesaid method.

Photographs, particularly aerial photographs, ordinarily used in photogrammetric procedures are subject to scale distortions due to the perspective nature of the views resulting from camera tilt and the relief of the terrain. Consequently, maps or mosaics based thereon are not suited for direct reading of scale data without appropriate adjustments or rectification of their aberant scaling. Other photogrammatic representations which are not so limited in usefulness are produced by scale correcting stereoplotter apparatus of he sort disclosed in U.S. Pat. No. 2,869,419, granted Jan. 20, 1959 to R. K. Bean, and U.S. Pat. No. 3,486,820, granted Dec. 30, 1969, to T. J. Blachut. In the orthorepresentations which are made by such apparatus all horizontal distances are reduced to the same scale independently of variations in elevation of terrain detail. The aforesaid orthophotoscopy technique starts with the creation of a stereoscopic model of the type produced in conventional stereoplotting equipment, also disclosed in the aboveidentified Bean patent and patents cited therein. Projectors in this equipment direct images from black and white diapositives upon a plotting area covered by a masking screen which with the exception of a small "scanning slot" opening left therein is opaque to the projected light. The stereoscopic model arises when anaglyphic filters are conventionally applied in projectors and associated viewing devices of the orthophotoscope which normally has one of its diapositives projected through a blue-green filter and the other through a red filter. Under the aforesaid masking screen is arranged a sheet of photographic film having an emulsion sensitive to blue-green light but not to red light. This film rests emulsion side up on a flat platen which is maintained parallel to a predetermined datum plane. A mechanical arrangement is provided for moving the masking screen in a horizontal plane, parallel to the film, either in the X- or Y-directions, that is longitudinally and transversely. While the film remains fixed with regard to displacements in a horizontal plane, it is displaceable along with the platen which is moveable in the Z-direction, or vertically. Controls are provided which direct the screen to move its scanning slot over the film in any selected direction for accomplishing a piecemeal exposure of the film to the projected images passing through the slot. A further, and critical control, resides in raising or lowering of the platen which bears the film and supports the screen to keep the scanning slot "on the ground" in the stereoscopic model. The screen and film remain essentially in contact at all times as the screen slides horizontally over the film. When a given strip has been scanned the scanning slot is shifted its own width in a direction perpendicular to the direction of scanning. Accordingly, a completely processed film becomes the basis for a full and corrected view of the terrain which is the equivalent of an orthographic photograph free of scale distortion due to relief or camera tilt.

Where stereoscopy in the orthophotoscope follows from an anaglyphic expediency, as explained above, the attendant photographic aspects are effectively limited to black and white diapositives, and only correspondingly shaded orthophotographs and other orthorepresentations can be produced therefrom. Heretofore, color orthophotography was possible with a substantial structural implementation of this orthophotoscope, including an additional projector slave-connected to a basic projector arrangement, but placed separately therefrom on one side of a light proof curtain where its disposition allowed it to follow the projectors of the basic arrangement and expose color sensitive film to a projected image in color corresponding to the stereoimage. Color photography is made applicable to the production of orthorepresentations by the present invention without an additional projector for recording since a utilization of stereoimage alternator stereoscopy in orthophotoscopes enabled thereby eliminates the need for color filters. A stereoimage alternator (SIA) system disclosed in U.S. Pat. No. 3,464,766, granted Sept. 2, 1969, to the inventor in the present case, is an example wherein a stereoscopic image or model arises from an interaction of lighting effects produced therein responsive to synchronous operation of shutters arranged in an optical system of a dual projector stereoplotter. More specifically, a shutter in each projector is driven to interrupt the light path of the respective projectors so as to intermittently pass and mask light directed toward a viewing surface. These shutters are correspondingly driven in uniform steps from predetermined relative positions such that they are alternately effective in the paths of the projected light to cut off light from one projector any time the other projector transmits light through the shutter associated therewith. A viewing mechanism is provided having a further shutter structure formed with two sets of spaced openings. The openings in the respective sets are located out-of-correspondence such that the relative displacements thereof across a sight opening traversing aligned portions of the sets allow light coming from one of the projectors and reflected from the viewing surface through openings in one of the sets to reach only one eye of an observer whereas light coming from the other projector and relfected from the viewing surface through openings is the other set to reach only the other eye of the observer, and in each instance the reflected light being observed in one eye is obscured from the opposite eye by a solid portion of the viewing mechanism shutter. Thus, with color filters not involved in the SIA system, an orthophotoscope in which this system is brought into play is not limited to the use of black and white photography but is adaptable for use with full color photography.

However, as was hereinbefore indicated, photographic film in an orthophotoscope is exposed to the light of only one of the stereoplotter projectors. Photographic film selectively sensitive to a predetermined filtered light, heretofore used in an orthophotoscope to limit its response to one of its projectors, would not serve that purpose where the SIA system functions. Since the present invention achieves picture separation for stereoscopy in the orthophotoscope by synchronizing shutter action, and not by selective filtering of projected light, the invention uniquely provides constant shading of the light one projector directs at the scanning slot of the orthophotoscope at the same time light from the other projector remains substantially free from interference by the associated shutter such that it is received in an effectively uninterrupted beam through the scanning slot. A somewhat similar form of orthophotoscope apparatus is evidently disclosed in a U.S. Pat. No. 3,583,809, granted June 8, 1971, to B. L. Y. Dubuisson, in which synchronously rotating discs and plates operating to block and sustain in opposite alternating sequences the passage of separate beams of projected imagery, and the sightings thereof by the respective eyes of an observer, are adapted to create the stereoscopic view, whereas a slot provided in a movable reflecting screen to facilitate exposure of an underlying film by light imagery reaching the screen is periodically masked by a reciprocating or rotating element to limit such exposure of the film to only one of the separate beams of projected imagery. Although the desired exposures may be achieved as described in this patent, it also appears that any orthophotoplans produced thereby would show separated bands of intermittent imagery. On the other hand, the obscuring portions of the associated shutter in the SIA system have aligned slotted openings therein which permit a requisite beam of light to reach the scanning slot without significant interruption when such portions are in effect masking the substance of the projected light. Thus, these special provisions accommodating the SIA system in the orthophotoscope avoid any significant impairment of the stereoimage or model observable at the viewing mechanism of the system. Where for the image separation use is made of a light polarizing or an anaglyphic filter system, requisite light for film exposure or an image recording is in effect continuously furnished from one of the projectors through a filter element therein characterized by a narrow, band-like discontinuity in its filtering surface which admits the traversal thereof by a beam of unfiltered light. The orthorepresentations produced in full color, as hereinbefore indicated, are more susceptible to a greater perception of their finer details. Nevertheless, with use of the SIA system such photographs are producible when observation of the stereoscopic model is in a single plane of best resolution whereas prior art limitations to colors as different as red and blue having best resolution in different planes compel observation in a less desirable plane. The greater light available where filters are not used also permits use of a greater range of film speeds and other exposure conditions for the orthorepresentation.

Accordingly, an object of the present invention is to provide a stereoscopic method and means for operating an orthophotoscope in a manner which produces photogrammetric representations in true color as well as black and white.

Another object of the invention is to provide a procedure and an apparatus applicable to increase viewing light in a more expeditious production by an orthophotoscope of precise orthorepresentations.

These and other objects and advantages of the present invention will become more fully apparent from the following detailed description of the invention set forth herein and from the accompanying drawings made a part hereof in which.

Figure 1:
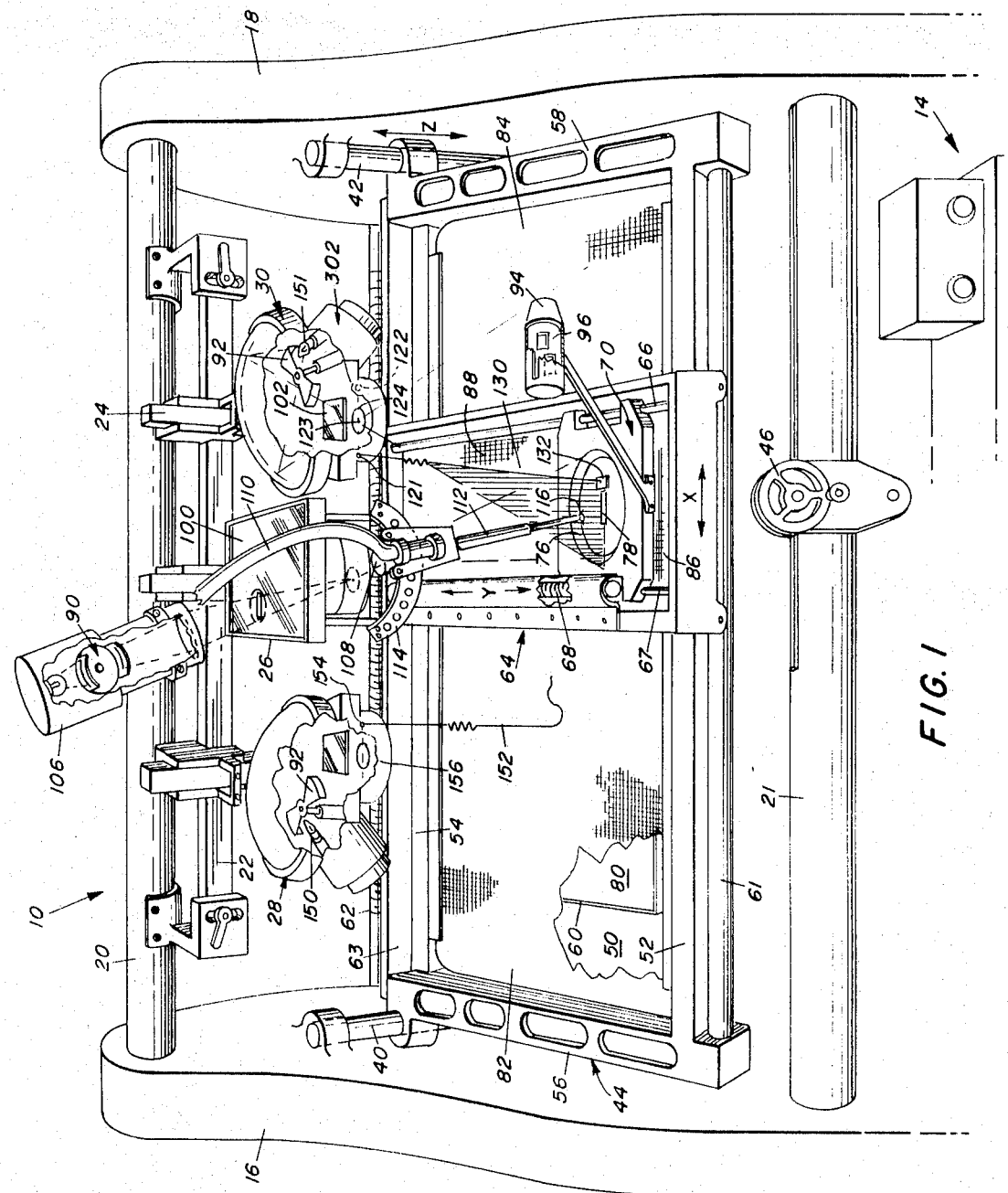
FIG. 1 is a partly pictorial and partly schematic front elevational view of the overall orthophotoscopic apparatus according to the present invention.

An improved orthophotoscope according to the present invention is represented in FIG. 1 as being generally characterized by an integral organization of substantial structural members constituting an upper framework 10 having operatively associated therein optical and photographic equipment and an underframe 14 supporting this equipment at a convenient height for use. Side frames 16 and 18 of this orthophotoscope are maintained upright by beams horizontally disposed to span between such frames, including relatively large diameter tubular members 20 and 21, at the upper rear and lower forward parts of framework 10, respectively. A track-like member 22, affixed along the upper tubular member, is engaged by a plurality of slidable clamping brackets 24 from which are suspended a Kelsh-type projector 26, and ellipsoidal reflector type projectors 28 and 30, arranged to the left and right of projector arrangement 26, respectively. Vertical shafts 40 and 42 affixed in aligned bearing brackets made integral with inner walls of side frames 16 and 18, provide rails on which a generally rectangular base frame 44 is suspended so as to span the space between the side frames. Rearwardly located brackets projecting laterally from frame 44 having openings through which shafts 40 and 42 extend to provide guiding supports for frame 44 in the varying vertical or Z-direction positions taken by it in response to a servo or selsyn motor drive under control of hand wheel 46. Forward tubular member 21 supports hand wheel 46 positioned thereon where the wheel is easily rotated by an operator facing frame 44.

A base plane 50 of the orthophotoscope is indicated in FIG. 1, as defined by the enclosure of frame 44 wherein it passes through horizontal front and rear parallel frame elements 52 and 54, respectively, and left and right side parallel frame elements 56 and 58, respectively. Frame elements 56 and 58 slant upwardly from front to rear at approximately 40 degrees from the horizontal plane, and the projectors are tilted accordingly so as to align their optical axes normal to plane 50. A vacuum type film platen 60, situated within frame 44, is maintained by its connections with frame elements 52 and 54 to dispose the film holding surface thereof in plane 50. FOrwardly extending brackets at the lower ends of frame elements 56 and 58 support in openings therethrough a horizontally extended cylindrical bar 61. A threaded rod 62 connected to frame element 54 is maintained contiguous thereto and in parallel alignment with bar 61, and a further track-like bar 63 affixed to the rear side of element 54. A relatively narrow, rectangular carriage 64 is maintained a slight distance above film support platen 60, and disposed parallel thereto, on its front and rear shorter frame elements having rounded runner supports which are disposed to bear on parallel bars 61 and 63, respectively. Carriage 64 is adapted to ride on its supporting bars, moving sideways or in an X direction, when a floating half nut which is affixed to the carriage and engageable with threads on rod 62 is displaced in response to a rotational drive to the rod. The longer frame elements of rectangular carriage 64 have arranged contiguous thereto, and in parallel alignment therewith, bars 66 and 67 which are maintained thusly disposed by connections in the shorter frame elements. The frame element adjoining bar 67 has further connected to it, for rotation with respect thereto, a further threaded rod 68. Carriage 64 is thereby equipped to provide a subsupport for a generally square platen structure 70 having formed integral therewith on two opposite sides thereof, runner extensions which bear on bars 66 and 67, and additionally affixed thereto a floating half nut (not shown) which engages threaded rod 68. Platen 70 can thus be accommodated by carriage 64 for displacements of the platen thereon forwardly and rearwardly, in the Y direction, in accordance with the drive from the threaded rod. A prominent circular area centrally located on a depressed part of platen 70 forms a disk-like light reflecting panel 76 having incised at its center a short, quite narrow horizontal slot 78. The slot opening is sized to accommodate the characteristics of the terrain being traversed, and in one form thereof is a 0.5 mm. wide and 5 to 40 mm. long. Slot 78 is aligned parallel to frame elements 52 and 54, as well as to carriage support elements 61 and 63, and thus is situated laterally oriented with respect to frame 44 so as to be maintained a minimal distance above the film holding surface of film support platen 60 disposed in the frame. Synchronous and stepper motors (not shown), arranged under base frame 44 are respectively connected to activate rotatable threaded drive rods 68 and 62 which, as hereinbefore indicated, are operable to determine displacements of scanning slot platen 70 longitudinally, or in the Y-direction, with respect to carriage 64, and displacements of this carriage laterally, or in the X direction, with respect to frame 44. Accordingly, platen 70 is also displaceable in the lateral of X-direction by any such movement imparted to carriage 64, and both carriage 64 and platen 70 are further displaceable in the Z-direction by drives responding to rotations of control wheel 46 which determine the vertical dispositions of frame 44 with respect to the several projectors affixed to track 22 on member 20. A further and more detailed description of corresponding interdependent carriage and platen structures subject to coordinated drives is available in the previously identified orthophotoscope U.S. Pat. No. 2,869,419, issued to R. K. Bean.

As was explained previously, the orthophotoscope is operable to produce a photographic representation of a scene which has been restored to remove scalar error due to the displacement of imagery caused by relief and tilt. This representation is initially caught on a sheet of photographic film 80 which is appropriately placed emulsion side up against platen 60, and held there by suction in a manner well known in the art. Curtaining film 80 are flexible screens 82 and 84, which are separately attached on one end thereof to tensioned spindle-like rollers (not shown) depending from frame elements 56 and 58, respectively, and on the other end thereof to bands clamped on the longer, sloping sides of carriage 64. Thus, any movement of carriage 64 in the X-direction allows screens 82 and 84 to shift in the X-direction in a manner which maintains covered all of film sheet 80 not within the area enclosed by the carriage. A further set of screens 86 and 88 are individually attached at one end thereof to respective rollers which depend from the shorter, horizontal sides of carriage 64, and at the other end thereof to bands clamped to the front and rear edges of platen 70. Screens 86 and 88 thus further shield film sheet 80 from exposure to surrounding light such that any light reaching film sheet 80 must enter through scanning slot 78, the only remaining path open for light directed at the film sheet. As will hereinafter be more fully explained, light originating in projector 26 actually exposes the film sheet when slot 78 is carried in the Y-direction and stepped in the X-direction by the controlled drives to carriage 64 and platen 70, occurring concurrently with the exercise of a further control displacing base frame 44 in the Z-direction. Shade-like coverings for obscuring the film sheet, of the type generally disclosed herein, are also described in further detail in the previously identified Bean patent on the orthophotoscope.

The orthophotoscope previously available for photogrammetry work, which fundamentally is an apparatus of the type disclosed in the aforesaid Bean patent, achieves image separation anaglyphically in deriving a stereoscopic model by the use of blue-green and red filters, together with blue-green sensitive photographic emulsion film sheet to limit the exposure of the film to the light radiating from only one of the two projectors. Image separation in accordance with one form of the present invention is accomplished by the stereoimage alternator cooperation disclosed in the previously identified patent on the SIA, and adapts apparatus such as disclosed in the aforesaid SIA and Bean patents for a cooperative relationship in which film sheet 80 is exposed to the light radiated from a single projector. A requisite cooperation for SIA stereoviewing in the form of the invention as disclosed in FIG. 1 is realized when a viewing area including panel 76 is covered with imagery of a stereo pair emanating from projectors 26 and 30. A rotatable shutter device ninety in projector 26, and another rotatable shutter device 92 in projector 30, have spaced openings which are correspondingly stepped to intermittently determine the light dispensed from the respective projectors to the viewing area. Since regular operation of the shutters automatically starts with the openings therein out-of-phase, it will be understood that anytime one projector's light is blocked the light from the other projector reaches the viewing area such that an alternating sequence of projected imagery is viewable. As further explained in the aforesaid SIA patent, a compatible sighting instrument, such as the viewing mechanism 94, comprising a shutter 96, is made available to observe the projected imagery. Shutter 96, which is rotatable about an axis traversing across the observer's eyes, has a separate set of spaced openings to confront the respective eyes of the observer. Openings in the respective sets are circumferentially located out-of-correspondence to effectuate the displacements of openings and blocking parts of the shutter by its rotation which allow light reflections originating in one projector to reach only one eye of the observer, and the reflected light originating in the other projector to reach only the other eye of the observer. By driving the respective shutters 90, 92, and 96 with positive shaft positioning motors, in a manner which is synchronous with respect to both speed and position, there is obtained the aforementioned dual imagery giving rise to a perfected stereoscopic model. A headband viewer for the SIA system may be used in preference to the viewer shown attached to the scanning platen for the convenience of the operator or if vibration caused by the viewer attached to the platen were to become a problem.

In order to enable use of the conventional large 230 mm × 230 mm aerial negative, or a contact diapositive made from it, in the orthophotoscope, a Kelsh type projector 26 taking this large showing as its diapositive 100, is adapted to cooperate with ellipsoidal reflector projector 30 wherein a 83 mm × 83 mm diapositive format 102 is applicable. Projector 26 is equipped with a lighting mechanism or illuminator 106 which in general resembles the illumination mechanism provided for the Kelsh-type projectors disclosed in the aforesaid SIA patent. Although illuminator 106 applies light from above to display a rather limited area of dispositive 100 at any given time, a patterned displacement of the illuminator over the diapositive, to be hereinafter more fully explained, covers the larger area. Such displacement is controlled by way of a gimbal and parallelogram linkage 108 on the projector mount, and an extension therefrom providing a carrier arm 110 for illuminator 106 which directs the illuminator as indicated. In a manner well known in the art illuminator 106 follows a drive from platen 70. This drive is transmitted to carrier arm 110 through a tracing table type telescoping arm 112 having at one end connections to linkage 108 and by extensions to an arcuate track plate 114 on which arm 110 is disposed to ride, and having at its opposite end a connection in a ball-pivot 116 established at a point which effectively lies on the film plane near the edge of platen disk 76. Other mounting structure provided for projector 30 includes a relatively wide ring 120 by which the mount is suspended from guide rail 22 of upper framework 10 by the interposition of clamp 24. Diametrically opposed holes in ring 120 accommodate pivot pins 121 and 122 on which projector 30 is supported in a conventional attachment. As indicated in FIG. 1, a line defined by passage through the pivot points, also passes through a medial plane axis of the projector lens 123. One end of a cord 130 is tied to pivot pin 121 which is situated precisely on the axis of lens exit node 124, from whence it stretches to a tab or clip 132 attaching the cord at its other end to platen disk 76 at an end edge of slot 78. By cementing the tab or placing the clip on that end of scanning slot 78 nearest projector 30, cord 130 is held at a point which is in effect along the longitudinal centerline through the scanning slot.

Initial steps taken to operate an orthophotoscope set up in the manner described with reference to FIG. 1, include orienting the projectors in conjunction with the positioning of frames 44 and 64 to properly relate the stereoscopic model to predetermined horizontal and vertical control points. Thereafter, with scanning slot 78 temporarily covered, platen 70 is moved to position the slot at a starting point for the scan, usually a corner of the neat model. After setting the speed of Y-direction scanning, in this instance, the surrounding area is darkened and scanning is started by driving platen 70 in the Y-direction to carry slot 78, now uncovered, over a strip of film sheet 80. Displacement of slot 78 is accompanied by manipulation of height regulating hand wheel 46 to maintain this slot at all times in contact with the apparent ground surface of the optical model. Thus, the strip area of film, which is as wide as slot 78 and equal in length to the model in the scanning direction, is exposed to imagery in light from projector 26, and since the platen is maintained by adjustments at a constant observed ground elevation, the relief displacement of images is eliminated. Light from projector 30 is prevented from entering slot 78 by cord 130 which remains in the path of such light directed at this slot at any point in the travel given the slot. As indicated by the partially hatched area between an outer ray from projector 30 and cord 130, and the heavy line darkening an area about slot 78, such light as is blocked by cord 130 leaves a shadow over the slot. Further, this shadow remains on the slot as platen 70 moves since the cord is held taut to the platen at attachment 132, and a shadow plane follows along therewith so as to constantly dispose a shadow in the path of the light directed at the slot. This shadow plane is thus always defined by the platen slot and the axis connecting the lens apertures through the external nodes of the lenses. Following completion of the scan over one strip of film sheet 80, carriage 64 is shifted a slot width in the X-direction so as to position slot 78 for scanning a contiguous strip, and Y-direction drive to platen 70 is resumed. A stepped sequence of scanning continues until approximately related halves of diapositives 100 and 102 are processed. It should be understood that the orthophotoscope product is made a half at a time because the aforesaid sequence covers the overlap area of two adjacent photographs rather than the entire area of either one. In this instance, the adjacent photographs are related representations on diapositive 102 and a further diapositive 136 mounted in projector 28.

In further explanation of the aforementioned two part development of a complete showing by the orthophotoscope, reference is again made to FIG. 1 where diapositives 100 and 102 are to be considered as having left and right sectors. Also as appears in FIG. 1, illuminator 106 beams a cone of light rays through a partial area of the left sector of diapositive 100 to produce a corresponding circumscribed imagery, whereas a lamp 151 in projector 30 gives rise to a cone of light rays transferring imagery of approximately all of the right sector of diapositive 102. However, these sectors thus activated by their light sources carry thereon corresponding subject matter of the stereo pair, and the light affecting diapositive 100 follows the displacement of illuminator 106 by carrier arm 110 which responds to the drive thereto from platen 70 by way of arm 112 and related linkage connections. Consequently, a stereoscopic model of adequate size is constantly available about disk 76 such that terrain relief, or the like, just ahead of slot 78 can be observed throughout scanning to facilitate a Z-direction control as required to achieve a selected datum plane for an orthophotograph, orthomap or other orthorepresentation being made.

When scanning is completed for the first part of the showing to be developed a recording of the left sector of diapositive 100 has been effectuated within the right half of film sheet 80. On the other hand, imagery for recording within the left half of film sheet 80 is derived from light passed through the right sector of diapositive 100, which corresponds to the imagery in the light display from the left sector of diapositive 136. Therefore, projector 28 is activated with the energization of lamp 150, and takes the place of projector 30 in the appertaining optical interaction whereas lamp 151 in projector 30 is switched off. In addition, cord 130 is freed from attachment 132 at slot 78, and replaced at the slot by a different extensible cord 152 which is stretched between a connection to a pivot pin 154, on a ring 156 supporting projector 28, and a connection to a further tab or clip placed at the opposite, or left end of the slot along the longitudinal axis thereof as viewed in FIG. 1. Platen 70 is again driven in coordination with Z-direction adjustments applied thereto, in the manner previously described, to displace slot 78 of platen disk 76 over longitudinal strips of sensitive emulsion on the left half of film sheet 80. Also, in the manner already described, illuminator 106 responds to this platen drive such that it follows a generally complementary path which in this instance is traceable over the right sector of diapositive 100.

Figure 2:
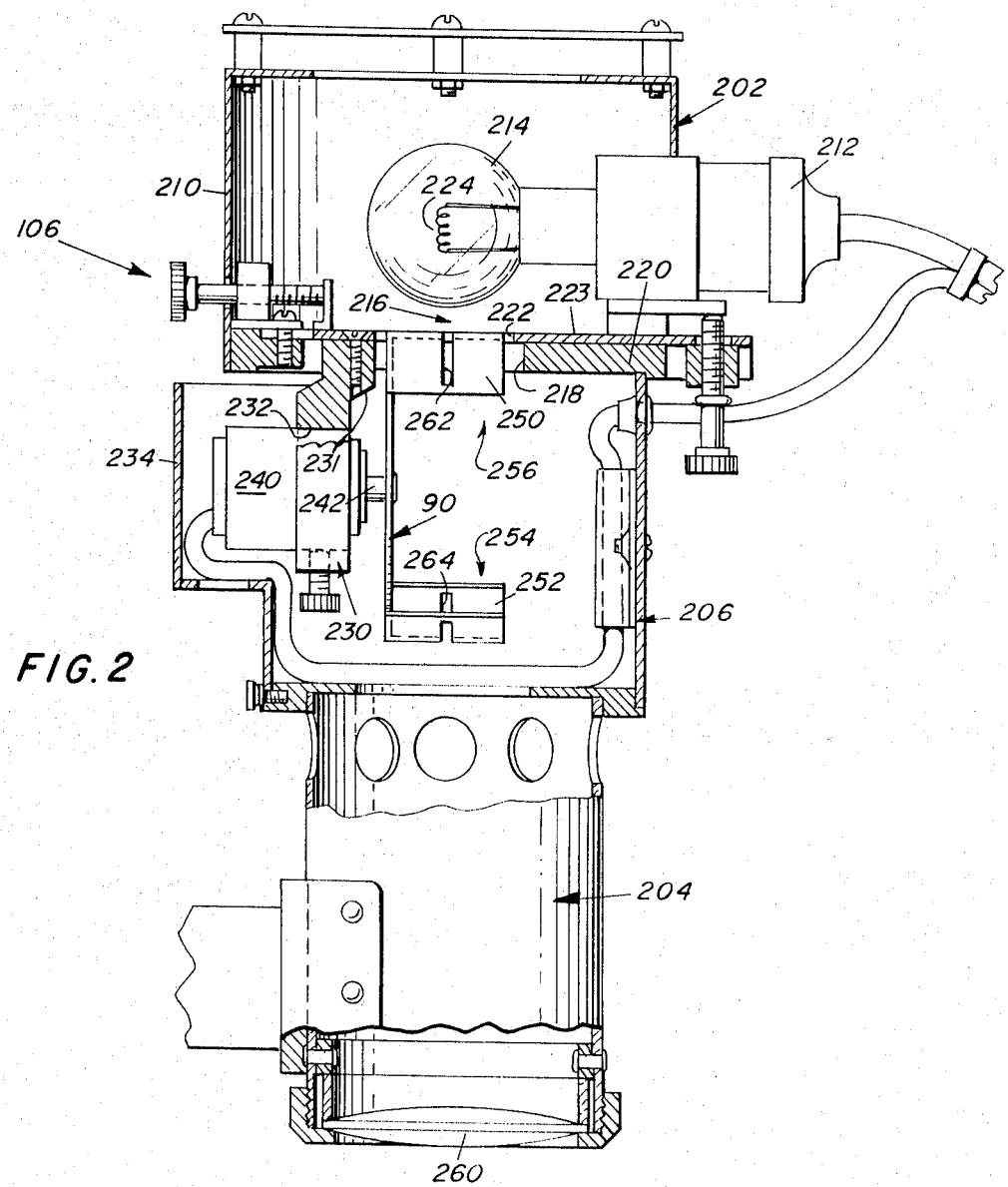
FIG. 2 is an elevational view of a fragmentary showing, partly in section, of one illuminator mechanism employed in the apparatus of FIG. 1.

Reference to the FIG. 2 showing of an illuminator 106 having utility in projector 26 reveals a close correspondence between its construction and the structural arrangement disclosed for the similar light projecting mechanism in the previously identified SIA patent. Thus, the instant illuminator includes a lamp section 202 and a condenser lens section 204 which are separated by a shutter section 206. However, as will be described later, shutter section 206 is especially constructed to facilitate the requisite functions of an illuminator in the cooperation of the present invention. A cylindrical enclosure wall 210 of lamp section 202 has a partial opening at one side wherein to a lamp assembly 212 is arranged to maintain a lamp 214 of the assembly centered directly over a relatively short gap 216 between the lamp and shutter sections. A central opening 218 in a cover plate 220, which ties together sections 202 and 206, and a rectangular opening 222, in an adjustable plate 223 slidable on plate 220, are parallel and coextensive in parts thereof which are aligned in gap 216 and with the filament 224 of lamp 214. A recessed collar 226, which ties together condenser lens section 204 with shutter section 206 in a manner made evident in FIG. 2, is characterized by a relatively large central opening 228. Openings 218 and 222 are further parallel and coextensive with opening 228, and together these openings are axially aligned with filament 224. On plate 223 are mounted lamp assembly 212, including means for the pivotal adjustment thereof, and a clamp collar bracket 230 which depends into shutter section 206 from the attachment of an offset flange 231 thereof to the plate. A circular opening 232 of collar bracket 230 is thus arranged perpendicular to support plate 223, so as to be parallel to the aforesaid axial alignment of the filament and openings, and opposite an outwardly protruding portion 234 of an enclosure wall 236 defining shutter section 206. This protruding portion provides space for a stepping motor 240 having a forward end of its casing fitted within opening 232 wherein it is clamped. Thus disposed, motor 240 is suspended in shutter section 206 such that its shaft 242 is directed radially with respect to the cylindrical axis of the section.

Shutter 90, shown in FIGS. 1 and 2, is attached to a shaft 242 of motor 240. Two identical, oppositely facing arcuate blades 250 and 252 of the shutter suggest a cylindrical member having quadrant spaces 254 and 256 alternating with the blades. Accordingly, motor shaft 242 maintains shutter 90 generally centered within section 206, and the spin axis thereof parallel to the surfaces of plate 223. Moreover, rotation of shutter 90 carries its peripheral elements to pass within openings 218 and 222, and therefore past the field of view which opening 228 is adapted to present to the lens 260 of condenser lens section 204. Circumferential slits 262 and 264 that deeply incise the arcuate blades at approximately halfway along their length leave only enough material at the slits to maintain the structural integrity of the blades. The narrow elongated slits provided in this manner are aligned with filament 224 of lamp 214 on the optical axis of lens 260. Consequently, slits 262 and 264 define a passage for a narrow plane of light which emanates from illuminator 106 when the optical passage for its light is otherwise blocked by the presence of one blade in plate openings 218 and 222, and another across collar opening 228.

It will be recognized that in the absence of slits 262 and 264 in shutter 90, the appertaining illuminator would intermittently emit light with the result that the projection of imagery upon disk 76, and through slot 78 occurs intermittently. Therefore, since only light from projector 26 affects film sheet 80, the picture product resulting therefrom would present only about one-half the diapositive showing within a venetian blind pattern. Avoidance of this ineffectual result while still retaining for the operator of the orthophotoscope a stereoviewing arising from alternating images projected by projectors 26 and 30 upon disk 76, is achieved by directing light during approximately 97 percent of each shutter revolution upon slot 78 by way of shutter spaces 254 and 256, as well as through slits 262 and 264, which allows light to reach the slot when blades 250 and 252 are disposed to otherwise obscure light from lamp 214. Also recognizable is that any short narrow band of light imagery projected by reason of the slits will constantly fall on slot 78 since imagery from projector 26 follows all movements made by platen 70 in the manner previously explained in connection with the displacement of illuminator 106 by linkage 108 and arms 110 and 112. Moreover, in view of the relative small size of the light bands due to slits 262 and 264, such extraneous light in the stereoimage alternator scene as might appear at viewer mechanism 97 is not a disturbing factor therein. Also notable is that the similarly narrow shadow which cord 130 makes on slot 78 does not significantly affect the stereoscopic model observable at the viewer mechanism.

Figure 3:
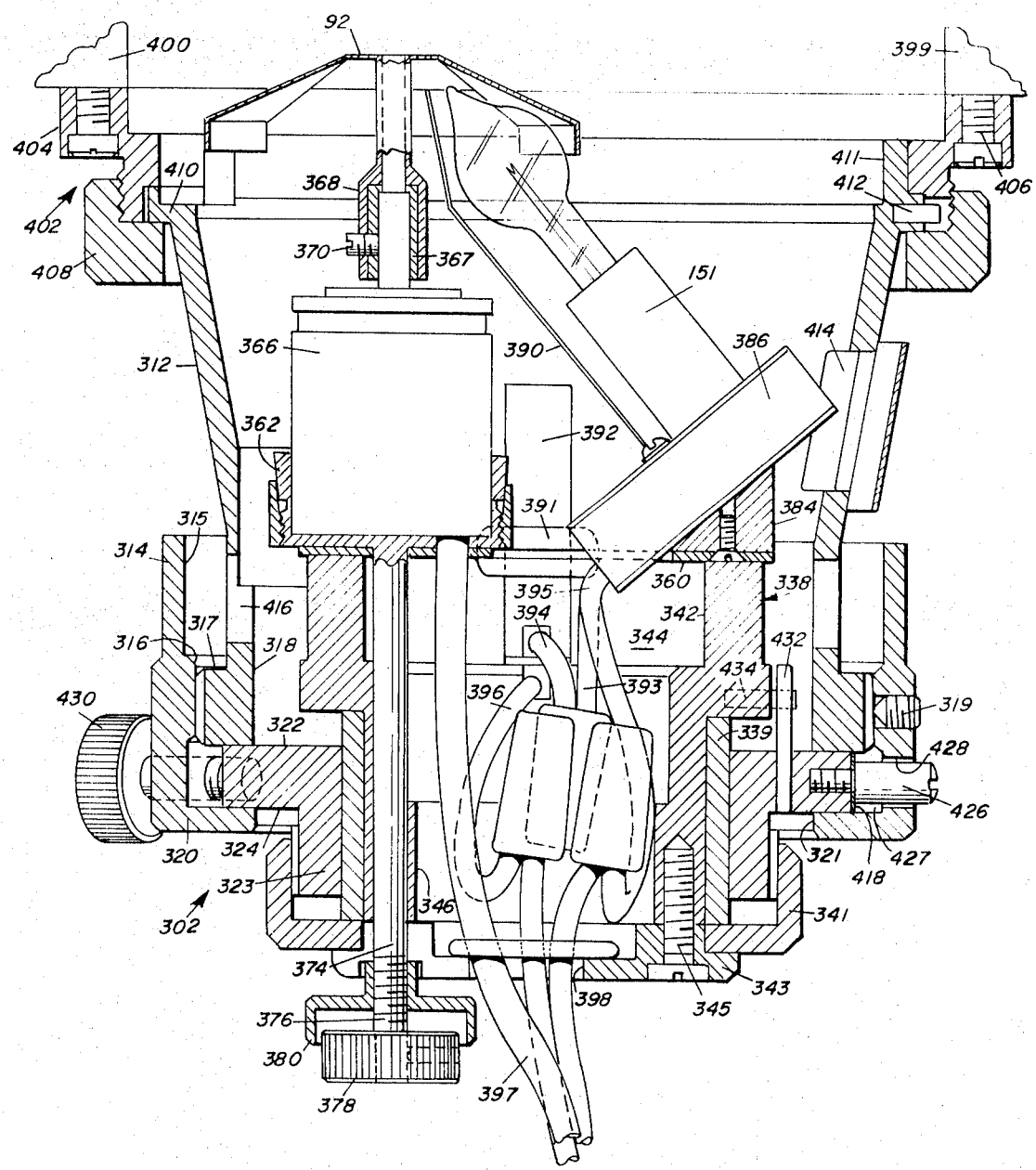
FIG. 3 is an elevational view, shown partly in section, of another of the illuminator mechanisms employed in the apparatus of FIG. 1.

Reference to FIG. 3 reveals illuminator 302 as having an outer casing formed by a generally cylindrical shell 312, which in part flares outward to an opening 313 at the forward or wider end thereof, and a further cylindrical shell 314 which receives within a forward opening 315 thereof a rearward cylindrical part of shell 312. Screw threads on a raised portion 316 of the inner wall of shell 314 are engaged by screw threads on an enlarged outer rim 317 at the rearward opening 318 of shell 312, so as to join the shells in a connection secured by a set screw 319. An inwardly bent flange-like rim 320 on the rearward end of shell 314 defines an opening 321 thereat. A flanged collar 322 having a cylindrical portion 323 thereof projecting through opening 321 is maintained thusly at rest in the rearward end of shell 312 by the disposition of its flange 324 between the outer surface of rim 317 and the inner surface of rim 320. As will hereinafter be more fully explained, collar 322 is a key element of a composite structure for which it facilitates lateral and longitudinal displacements in connection with properly locating the filament of projector lamp 151, supported on the structure, with respect to the lens and reflector structure of projector 30. In addition to collar 322, the composite structure includes a lamp socket insulator pedestal component 338, a metal sleeve 339 which sheaths a reduced cylindrical end of component 338 and slip fits within collar 322, a screw-on cap 341 which is held adjacent a back end opening of collar 322 by a threaded engagement thereof on a threaded surface of cylindrical collar portion 323, and a plug cap 343 which fits into and over collar 322, and is held in place by a machine screw 345. Component 338 is generally cylindrical hub-like member having extending therethrough a central passage 344 which by steps diminishes in diameter from an opening 342 in a forward section of the component to an opening 346 in a rearward section thereof. Further, the exterior edges of sleeve 339 and collar 322 at opening 346 thereof, are held in contact with interior surfaces of caps 341 and 343, respectively, by fastening 345. Upon the rim of the forward component opening 342 is fastened a plate 360 on which is supported a collet-like receptacle 362 having a slotted periphery, and to which is fitted a stepping motor 366 which in turn is secured by a forward adjustment of ring 363. Light control shutter 92 is arranged to be driven by motor 366 through a connection of the motor shaft, fitted with a heat insulating phenolic sleeve 367, within a socket coupling 368 at the end of the shutter shaft which is secured by a set screw 370. Angular displacement of receptacle 362 is facilitated by a spindle shaft 374, extending rearwardly from the receptacle, so as to pass through conformable openings in plate 360, component 338, and cap member 343, and project as a stem 376 outside of the structure of casing 312. A shutter position adjusting knob 378 affixed by a set screw to the end of stem 376 cooperates in a conventional manner with a locking knob 380 which is rotatable on the stem so as to be brought to bear in a depression on cap 343 and lock receptacle 362 in place on plate 360 following an angular adjustment of the shutter drive.

A central opening in plate 360 characterizes it as a flat ring providing a relatively wide rim surface having secured thereto, at a location opposite receptacle 362, a wedge shaped bracket 384 underlying a support structure maintaining lamp 151 in a predetermined position with respect to a pair of identical petal-like blades and interspaced openings of shutter 92. A rectangular lamp socket 386 is attached to bracket 384 such that by extending into the opening in plate 360 the socket is disposed at about a 45° angle to plate 360. Socket 386 thus constitutes a base for lamp 151 which is affixed to the socket so as to extend forwardly at right angles thereto. As a result of this forward extension of lamp 151 the lamp is positioned such that its filament is situated within the cover of shutter 92. A metal lamina strip 390, held by attachment to socket 386, is disposed between lamp 151 and receptacle 362 so as to function as a heat shield for the motor. Located adjacent motor 366 is a fixed temperature normally closed thermostatic switch 392 which is held in place by a grommet 391 attachment fitted into plate 360. Electrical lead 393 from socket 386 is joined to a terminal nut with lead 394 of switch 392, and further electrical leads 395 and 396 from the socket and switch, respectively, are connected to complete a circuit to a power source for lamp 351. Thus, with switch 392 in a series circuit with the lamp, occurrence of the switch operating temperature in proximity to motor 366 results in opening the switch contacts in the lamp energization circuit. Electrical connections to motor 366 from its power source and operating control are made by way of a cable 397 which together with the lamp circuit wiring exit illuminator housing 312 through passage 344 in hub 338 and a suitable central opening 398 in cap member 343.

The forward end of illuminator 302 is positioned over an opening 399 in the main housing 400 of projector 30, and clamped to the housing by a coupling assembly 402. Comprising assembly 402 are a circular fitting 404 which is attached to housing 400, by screws 406, contiguous to the edge defining housing opening 399, and a recessed clamp ring 408 engaging within its recess a narrow external flange 410 adjacent a peripheral cylindrical part constituting the forward rim of shell 312. A radial pin 412 in flange 410 is placed to coact with a slot in a recess of fitting 404 so as to properly locate illuminator 302 over housing opening 399, and screw threads on a reduced circular extension of fitting 404 are engaged by internal screw threads of clamp ring 408. The clamp ring is thereupon tightened to secure the coupling such that when fitting 404 and flange 410 are mated the requisite axial alignment of illuminator 302 with opening 399 is obtained. When illuminator 302 is thus situated for operation, a ventilation opening 414 in shell 312, equipped with a slight shield, is facing upward. Additional provisions permitting air to circulate in housing 310 include openings 416 in a rearward part of shell 312.

As was hereinbefore indicated, proper alignment of the filament in lamp 151 with respect to the optical system of projector 30 is enabled by parts arranged to coact with collar 322 of the internal structure of illuminator 302. In this connection, an extended leaf spring 418 is secured at a central part thereof to the rim of collar flange 324, by means of a screw fastener 426 having an elongated head, and press fitted into an annular space 427 which exists between the collar and shell 314. An opening 428 in shell 314 is sufficiently enlarged to allow screw head 426 to extend therein and through annular space 427 such that it is generally displaceable within limits imposed by the opening. Further lateral openings spaced apart in shell 314 have threads therein engaged by screws, such as thumb screw 430, which are adapted to apply counter-spring forces to separate points on the rim surface of flange 324 in annular space 427. Consequently, collar 322 can be laterally shifted in a positive manner within annular space 427 by the adjusting screws to effectuate displacements of pedestal component 338 and lamp 151 carried thereon with respect to projector housing 400. Longitudinal displacements of pedestal 338 with respect to housing 400 can be accomplished by causing the pedestal to slip within the central opening of collar 322 in response to rotative adjustments of cap 341 on the collar which itself is held from such displacements by the rear edge of shell 312 and end flange 320 of shell 314. In addition, a pair of spaced pins, such as pin 432, affixed in a forward cylindrical section of pedestal 338, receives between them a further pin 434, affixed in the forward rim of collar 322 for the purpose of guiding the longitudinal displacements of the pedestal. Adjustments of the lamp and shutter in three coordinate directions thus facilitated, allow the lamp filament to be placed at one of the fixed focus points of the projector's prolate ellipsoidal reflector while the other focus point of the reflector is set at the projector's lens aperture.

Figure 4:
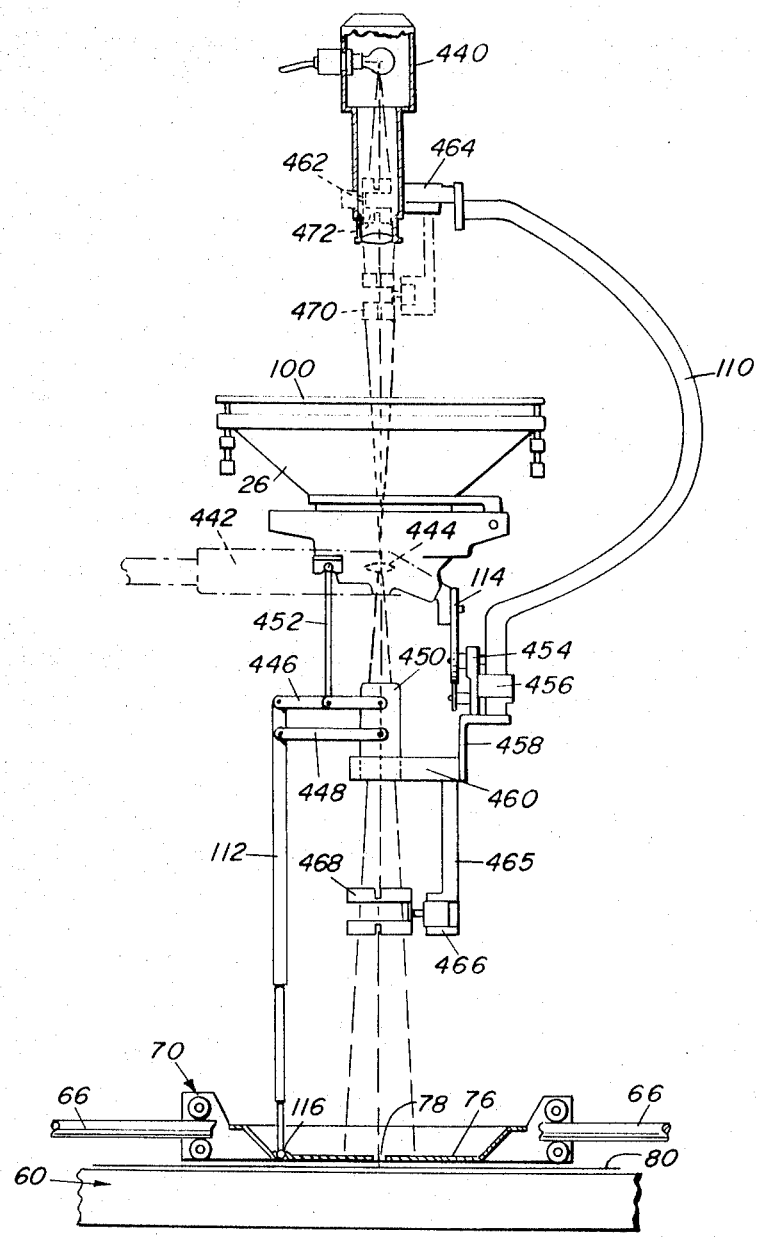
FIG. 4 is an elevational view of a fragmentary showing, partly in section, of a further embodiment of a light image regulation mechanism appearing in FIG. 1.

Reference is now made to FIG. 4 to disclose optional dispositions of a slotted shutter in accordance with the present invention for a Kelsh type projector such as projector 26 in FIG. 1. The overall structural arrangement in each instance is essentially the same as that previously disclosed in connection with FIG. 1, and accordingly, the projector is disposed in a coordinated cooperative association with driven platen 70. Illustrated in FIG. 4 are vacuum film support 60 whereon film 80 is held positioned for traversals thereon by platen disk slot 78, as the platen is tracked along rods 66 and 67, and a modified illuminator 440 which is caused to sweep across the projector's diapositive 100 in response to the platen's displacements. Sequences of contiguous portions of film 80 are thus continuously exposed to changing light images from the illuminator which pass through a slotted shutter and platen disk slot 78, in the manner and for the purpose heretofore disclosed. Mounted for pivotal movement about points in a median plane through the projector's yoke assembly 442, wherein lies the exit node point 444 of the projection system, are coordinating connections for the aforesaid cooperation including parallelogram bars 446, 448 which link telescoping guide rod 112 from its pivotal connection 116 on disk 76 to an intermediate light passage tube 450, and hanger arms, such as element 452, which tie arcuate track 114 to exit node gimbal structure in yoke 442. A trolley plate 454, adapted to ride on a track formed by the inner arcuate edge of guide 114, carries affixed therein a mount 456 for a ball bearing at the end of lamp housing arm 110. Mount 436 in turn provides a surface having secured thereto an angled bracket 458 adapted to support a fitting 460 in which light passage tube 450 is further held. A clamp-type mount 462, having a connective extension 464 to support arm 110, maintains illuminator 440 properly disposed with respect to diapositive 100 to facilitate a radiation of the illuminator beam through the diapositive and the further optical system of the projector including light passage tube 450. Depending from the underside of fitting 460 is a bracket arm 465 having at its extended end, formed as an integral part thereof, a clamp collar 466 in which is secured the stepping motor for a slotted shutter 468. Maintained thusly, the slots of shutter 468 are situated where they are aligned on the optical axes of the projected beam during a predetermined portion of each revolution of the shutter, as hereinbefore explained relative to FIGS. 1 and 2. Accordingly, light emitted from tube 450 is intermittently intercepted by the shutter vanes and restricted to pass through the aligned slots, and since the aim of illuminator 440 is at all times directed by the action of rod 112, and the parallelogram structure interconnected therewith upon support arm 110, in accord with the displacements of platen 70, light available from the aligned slots is received through platen disk slot 78. Other convenient locations for the rotating slotted shutter are indicated by dashed-line representations in FIG. 4 of a shutter 470, maintained suspended from illuminator mount extension 464 between the illuminator and the plane of diapositive 100, and a shutter 472 mounted for rotation in the illuminator housing adjacent to the condenser lens thereof. However, the sharpest and narrowest slot of light with maximum brightness is achieved by the utilization of shutter 468 since it is furthest from the light source.

Figure 5:
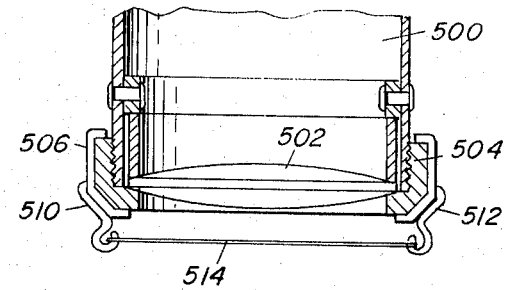
FIG. 5 is an elevational view of a fragmentary showing, partly in section, of a further embodiment of a shadow producing mechanism employed as part of a projector in the apparatus of FIG. 1.

In a further embodiment of the present invention, ellipsoidal reflector projectors 28 and 30 are replaced by Kelsh projectors of the type described with reference to FIGS. 1, 2 and 4. More specifically, appropriate linkages having connective arms to platen 70 would be provided to accomplish a coordinated follow-up drive to the respective illuminators associated with the projectors in a manner heretofore described in connection with projector 26 shown in FIG. 1. As was the case in the first embodiment disclosed, the instant projectors are used one at a time in conjunction with projector 26, to sequentially process different halves of a particular diapositive. In addition, provisions are made to prevent the replacement projectors from affecting film sheet 80 with their light images. For this purpose a unique shadow bar arrangement can be used instead of employing an elastic string in the manner heretofore disclosed. Reference to FIG. 5 reveals a condenser lens section 500 of the usual illuminator structure associated with the Kelsh type projector, including a lens 502 secured by a retainer ring or bezel 504. Conventional filter mounting clips 506 and 508 are snapped on bezel 504 at diametrical points thereon. Integrally formed with the respective clips are hooks 510 and 512 which are further fashioned to extend a predetermined distance away from the plane of lens 502. Hooks 510 and 512 are spanned by a bar 514 having a predetermined thickness. Hook length is determined by the available space between the diapositive plate of the projector and the lens end of condenser lens section 500 at the nadir of the illuminator swing during operation. Since bar 514 is thus maintained as close as possible to the diapositive without contacting it, the resultant image of the bar is a sharply defined shadow upon slot 78 of the platen. However, bar 514 also effectively shades platen panel slot 78 when the bar is attached to move with the lamp housing guide arm 110 so that it will pivot about projector lens exit node 444 shown in FIG. 4. Panel slot 78 is thus faithfully tracked by the shadow of bar 514 when platen 70 is driven in a scanning operation. If guide arm 110 is attached off the "X" axis of this panel slot, a parallelogram attachment is used to direct the central axis of the illumination beam to track the panel slot as the platen is caused to traverse the stereo model. The most suitable thickness for bar 514 is determined by the geometry of the overall apparatus, in an obvious manner.

Figure 6:
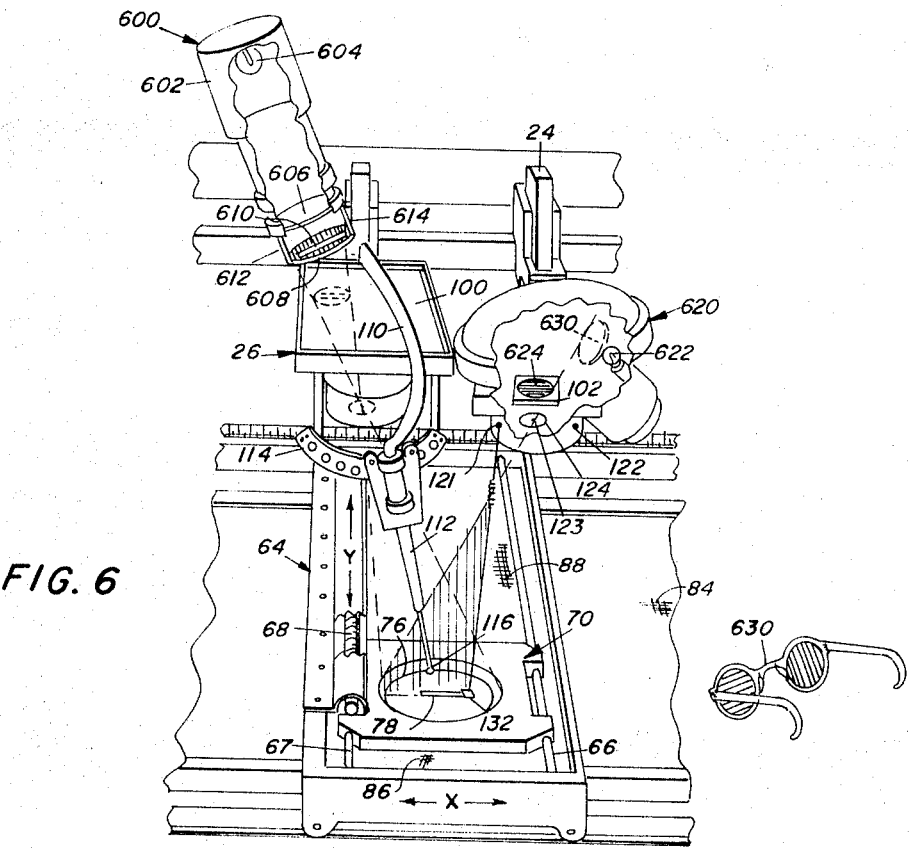
FIG. 6 illustrates by a fragmentary showing of an orthophotoscope similar to that presented in FIG. 1 a further embodiment of the present invention wherein stereoimage projection is facilitated by a polarizing or anaglyphic filter system.

An orthophotoscope apparatus wherein either an anaglyphic or polarizing filter system is adapted to accomplish image separation is also adaptable in accordance with the present invention to produce orthophotomaps directly from aerial photographs in either black or white or actual color. In the showing of FIG. 6, a polarizing system which appears as part of a basic orthophotoscope structure may have either linear or circular polarizers serving to separate images in a well known manner more fully explained in U.S. Pat. No. 2,018,963, granted Oct. 29, 1935, to E. H. Land. An illuminator 600 of the type disclosed in U.S. Pat. No. 2,492,870, granted Dec. 27, 1949, to H. T. Kelsh, is an integral part of this orthophotoscope which otherwise has a general structural organization corresponding to that illustrated in FIG. 1. A casing 602 of the illuminator houses a lamp bulb 604 from which light beamed through a condensing lens 606, and a specially prepared polarizing filter 608, is received on a predisposed diapositive 100 of projector 26. Thus, as was previously explained with reference to FIG. 1, elemental images of the diapositive are successively imparted to panel 76 of platen 70 when in an operation of the apparatus herein the beamed light is swept through a patterned scan of the diapositive by direction from the platen as it is driven to scan the stereoimage. Filter 608 is distinguished by the absence of the filter medium within a narrow, elongated light passage 610 which extends across a central region of the filter. A suitable light passage is provided by a transparent section of the filter as well as by any window-like slot formed in the filter such as a gap therein between two equal parts of the filter in an assembly which allows a small physical separation between the two pieces. Filter 608 is retained with its functional surface perpendicular to the beamed light path by mounting clips 612 and 614 which secure the filter ahead of the lens opening in casing 602.

Now evident from the foregoing is that when filter 608 is in the projection system of projector 26 properly positioned with respect to the lens elements thereof, and having the correct orientation, all imagery from this projector will be filtered except for a narrow band of light equal in width to that of passage 610, and extending the full length thereof. The band of unfiltered light is constantly maintained to fill slot 78 in the platen panel, so as to expose contiguous portions of film sheet 80 thereunder, by the control imposed on illuminator 600 by the displacements of lamp housing arm 110. As was previously explained with respect to FIG. 1, arm 110 maintains a fixed relationship between platen panel slot 78 and the exit node of the lens of projector 26 which in this instance requires the band of unfiltered imagery to faithfully track the opening of slot 78 as the stereoimage is traversed by the platen.

Two ellipsoidal reflector type projectors are arranged to cooperate with the FIG. 6 adaptation of projector 26 in essentially the same manner previously described for the corresponding components in connection with the showing in FIG. 1. One projector 620 of the two projectors of the ellipsoidal pair is shown in FIG. 6 as including a lamp bulb 622 which by way of the projector's reflective surfaces directs light filtered by a polarizing filter 624 through diapositive 102 of the stereo pair. Light imagery thus produced by projector 620 is imparted to platen panel 76, and in association with the light imagery from projector 26 gives rise to the stereomodel in accordance with the previously indicated well known principles of stereoscopy. To prevent the light imagery supplied by projector 620 from exposing film sheet 80 through platen panel slot 78, a stretch cord 130 is applicable to shade the slot in the manner hereinbefore described with reference to this structure as shown in FIG. 1. Polarizing eye glasses 630 are used by the operator of the apparatus in a conventional manner, more fully described in U.S. Pat. No. 2,203,687, granted June 11, 1940, to E. H. Land et al., to view on a smooth aluminized, high gain type surface, characterizing platen panel 76 in this instance, the stereoimage rendered thereon by projectors 26 and 620.

An anaglyphic filtering system employed in an orthophotoscope is correspondingly adapted to provide orthophotomaps in actual color as well as in black and white. Accordingly, an anaglyphic filter is prepared with a window-like light passage through a central region thereof, as was previously described for filter 608, and also attached by filter mounting clips, or the like, to illuminator housing 602. Replacing polarizing filter 624 in projector 620 is a complementary anaglyphic filter 630 which is installed over lamp bulb 622 in a manner more fully described and shown in U.S. Pat. No. 2,737,846, granted Mar. 13, 1956, to R. K. Bean. As before, exposure of film sheet 80 is limited to light imagery from projector 26 beamed through the filter passage and the platen panel slot by the coordinated platen drive to illuminator 600, and the shading of the slot obtained from stretch cord 130. In conjunction with the use of anaglyphic filters in the apparatus, a conventional pair of anaglyphic filter eye glasses are used by the operator, instead of the polarizer eye glasses shown in FIG. 6. In this instance, where an anaglyphic filter system is made applicable in the apparatus the stereoimage is best viewed on a diffused white surface with which platen panel 76 is then provided.

Figure 7:
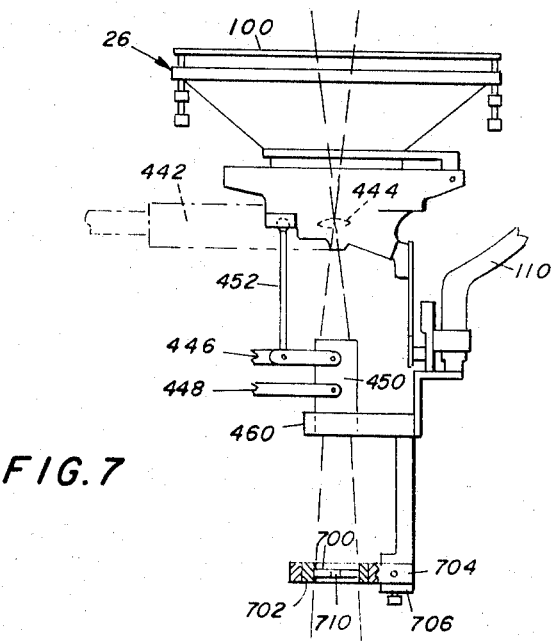
FIG. 7 illustrates by a fragmentary showing of a light image regulating system similar to that presented in FIG. 4 a further embodiment of the filter system utilized in the embodiment of FIG. 6.

Reference to FIG. 7 makes evident an optional disposition of a slotted filter 700 in accordance with the present invention for a Kelsh type projector such as projector 26 which, as it appears in FIG. 6, employs an illuminator 600. However, instead of clip mounting the slotted filter to the illuminator casing as shown in FIG. 6, this filter is situated in the path of a light beam which exits from intermediate light passage tube 450 as was previously disclosed with reference to FIG. 4. Filter 700 is caused to follow the excursions of tube 450 by the rigid connections therebetween. More specifically, the filter is securely seated in a ring mount 702 having a rod-like extension 704 fastened within a clamp collar 706 formed as an integral part of bracket arm 465 extending from fitting 460, which, as more fully appears in FIG. 4 is made fast to lamp housing guide arm 110 as well as to the light exit end of tube 450. Thus, it will be evident by further reference to FIG. 4, and the description thereof given herein, that filter 700, including a slot 710 provided therein, is maintained in the path of light projected through exit mode point 444 by the connecting linkages, and the functions appertaining thereto, are as were previously disclosed to explain the operational coordination between the projected light and the displacements of slotted shutter 468.

Figure 8:
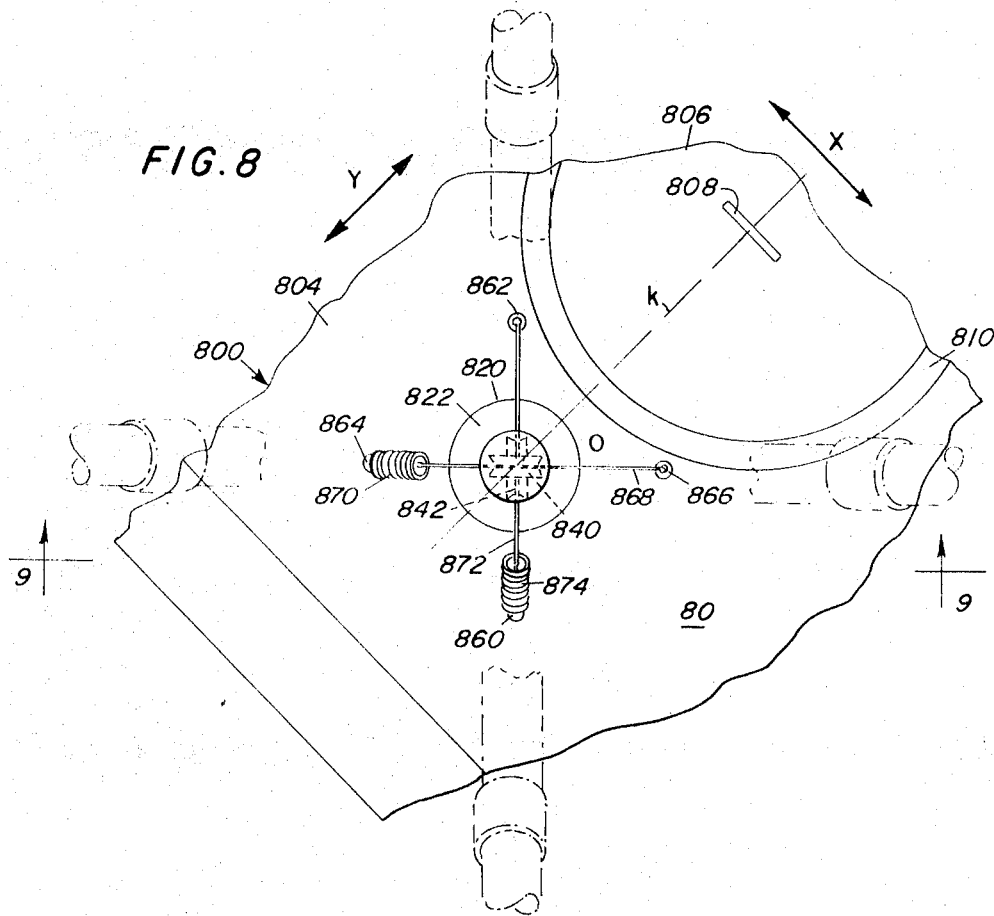
FIG. 8 illustrates in a fragmentary showing of a platen with a linkage thereto from a light source a structural alternative of a connective arrangement therefor having utility in the apparatus of FIGS. 1, 4 and 6.
Figure 9:
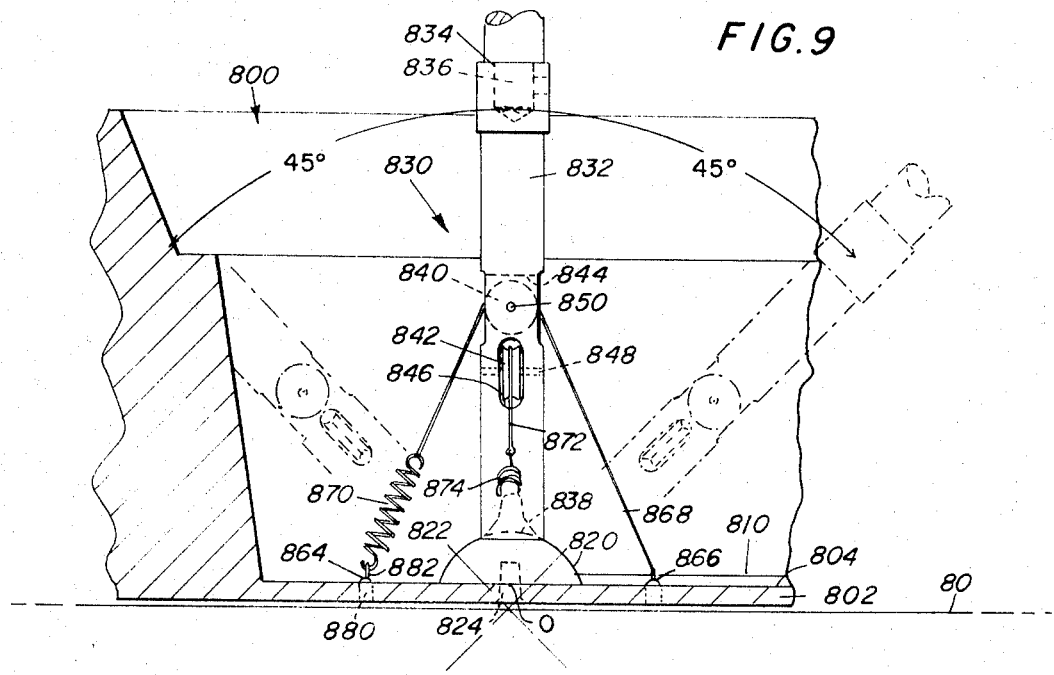
FIG. 9 is taken along lines 9—9 in FIG. 8 to reveal an elevational view further showing the alternative connective arrangement.

In the embodiment of the present invention disclosed herein with reference to FIGS. 8 and 9, the pivot about which the platen end of telescoping arm 112 swings is effectively a point in the very plane of film sheet 80.

Further consideration of the linkage connections from arm 112 to either of light projectors 106 or 440, heretofore described with reference to FIGS. 1 and 4, makes evident that the closer this nether pivot point for arm 112 is brought to the plane of film sheet 80 the more steadily a precise correspondence can be maintained between the narrow slot in the platen panel and image projection thereon throughout the full range of platen displacements. A displaceable platen 800 being represented in FIGS. 8 and 9 for the instant embodiment has a dependent, relatively thick framing enclosing a relatively thin slotted plate constituting a base thereof, much like that provided for platen 70 of the embodiments appearing in FIGS. 1, 4 and 6. However, platen 800 is characterized by a slightly thicker base plate 802 having centrally situated in its outwardly facing surface 804 a depressed circular area which constitutes its light reflecting panel 806. Centered in panel 806 is a rectangular cut through plate 802 which provides a relatively narrow short horizontal slot 808 corresponding to slot 78 disclosed for platen 70. Panel 806 is ringed by a narrow boss 810 raised on base surface 804 to stiffen plate 802 where reduced for the panel. The several drives heretofore disclosed for platen 70 operate upon platen 800 to translate it over film sheet 80 in the coordinate paths identified in FIG. 8 by he conventional X and Y directional notations.

Connections for a pivotal arrangement in the further embodiment of FIGS. 8 and 9 are made to plate 802 in an area of surface 804 thereof which lies outside the furthest edge of panel boss 810. More particularly, such connections are disposed about a point O on a line $k$ which by extending frontward parallel to the Y-direction indicator would bisect panel slot 808. As appears more fully in FIG. 8, point O is situated relatively close to panel 806 where it underlies a central point of a rounded prominence 820 which is attached to platen surface 804. Curvature manifest on a surface 822 of prominence 820 corresponds to that on a spherical sector delineated by a plane of surface 804 intersecting a sphere of requisite size having its center in the plane of film sheet 80 at a point therein aligned with point O on a perpendicular to the aforesaid planes. Thus, it will be evident that the trace of any path on surface 822 follows from motion which can be characterized as pivotal displacement about a point in the plane of film sheet 80. However, prominence 820 actually subsists as a knob-like member having a flat side thereof in contact with platen plate 802, and is secured to the plate by a suitable screw 824 which is applied through the underside of plate 802 to engage a threaded hole in the member.

Telescoping arm 112 is maintained in an operative relationship with platen 800 by a connective arrangement 830 wherein a tubular rod 832, made applicable as a dependent extension of arm 112, is adapted to constrain movements imparted to this arm by translations of platen 800 to follow paths across surface 822 of prominence 820. Accordingly, oscillations and other swings taken by arm 112 in such operational excursions are measurable as angular displacements thereof about a point in the plane of film sheet 80. More specifically, extension rod 832 has an enlarged end thereof which provides a collar 834 wherein a stud-like projection 836 at the end of a dependent section of arm 112 is received and secured by a set screw, or the like, in a conventional manner. A drilled and countersunk opening in the opposite and extended end of rod 832 has screwed or cemented therein a bearing shoe 838 which is adapted to rid on prominence 820, and whereon becomes applicable such axial thrust as arises between arm 112 and platen 800 during operation. In evolving shoe 838 from a suitable bearing material, such as Teflon, its surface adapted for exposure is requisitely concaved to match the curvature of spherical surface 822, and appropriately finished to facilitate sliding contact thereof on that surface. Connective arrangement 830 further includes applicances to counteract those forces upon arm 112 tending to disrupt the contact wherein shoe 838 is kept riding on prominence 820 so as to maintain the requisite guidance therefor which holds the pivot point of arm 112 in the plane of film sheet 80. These applicances, as disclosed herein, appear in FIGS. 8 and 9 as a set of self-adjusting, spring loaded pulley systems. Pulleys 840 and 842 of the respective systems are housed in telescoping arm extension rod 832 provided therefor with slotted openings 844 and 846, respectively, wherein the pulleys are rotatably mounted upon walls adjacent the openings which constitute bearing blocks for shafts 848 and 850 of the respective pulleys. As more fully appears in FIG. 9, two adjacent medial portions of a cylindrical body constituting rod 832 have slotted openings 844 and 846 fashioned therein so as to be separately oriented within different perpendicular planes which intersect on the central axis of rod 832. Consequently, pulleys 840 and 842 are disposed one above the other, and the planes in which they rotate are at right angles to each other. These planes of pulley rotation are initially set at a 45 degree angle relative to vertical planes through the X and Y directional notations appearing in FIG. 8, so as to facilitate pulley line attachments to pivotal anchor devices 860, 862, 864 and 866, secured in platen surface 804 wherein their symmetrical disposition with respect to point O also locates such devices in the planes set at 45 degrees. Accordingly, arm 112 is brought to bear on prominence 820 through its extension rod 832 which takes an upright disposition to locate shoe 838 thereof centrally upon bearing surface 822. Thereafter, a pulley line 868 then pulled about the groove rim of pulley 840 has one end thereof attached to anchor device 866, and its opposite end attached to one end of a coil spring 870 which is stretched from its opposite end attachment to anchor device 864. In a corresponding manner a coordinate pulley line 872 then pulled about the grooved rim of pulley 842 has one end thereof attached to anchor device 862, and its opposite end attached to one end of a coil spring 874 which is stretched from its opposite end attachment to anchor device 860. Exterior fastenings of the several anchor devices to which line and spring attachments are made have rotational freedom in a plane of platen plate 802. Conventional fishhook ball bearing type swivel connectors are applicable as anchoring devices in the disclosed arrangement since a casing 880 of such a connector is fixable in the platen plate so as to locate a rotatable eyelet fastening 882 thereof above surface 804 of that plate.

As illustrated by the phantom lines of FIGS. 8 and 9, the ready flexibility of connective arrangement 830 enables arm 112 to swing widely in all directions and still maintain the contact of its bearing shoe 838 with prominence surface 822 required to establish as a pivot for the arm a point in film plane 80. Since in the pivotal swings of rod 832, as it moves together with arm 112, pulleys 840 and 842 trace spherical paths centered in film plane 80, whereas at the same time lines 868 and 872 at the pulleys tend to define ellipses wherein the anchoring points of these lines are the focii of such ellipses, it will be evident that tensions in springs 870 and 874 vary from a greater to a lesser degree as rod 832 is displaced from its vertical disposition at the apex of prominence 820 towards inclinations thereof with the vertical. Thus, such springs are chosen to provide adequate tension to maintain a requisite contact between shoe 838 and surface 822 when arm 112 is at its extreme declinations. As an alternative, constant tension springs, such as the Negator spring, can be used to maintain uniformly this bearing contact throughout all operative drives to arm 112.

Other modifications and variations in the details of the present invention are possible in light of the disclosure herein. For example, scanning may be accomplished in either the X or Y directions by orienting the slotted shutter and shadow device along the appropriate axis of the scanning slot. As hereinbefore disclosed, the guide rod on the exposing projector is placed to the rear of the platen disk on the central Y axis of the slot and attached at the film plane. This arrangement requires the use of a parallelogram to keep the lamp and shutter slot centered on the exposing slot as it traverses in the X and Y directions. In an alternative arrangement an attachment which can be used to achieve satisfactory results without the use of a parallelogram linkage places the guide rod at the side of the scan slot in the film plane. When this connection is used the projector slot illumination is kept on the X axis of the slot as it traverses in the Y direction. As the platen is moved in the X direction from the projector's nadir point a slight shift of the slot illumination in the X direction occurs, but does not affect the system's performance. It is therefore to be understood that within the scope of the appended claims the invention may be practiced otherwise than as specifically described.

I claim:

1. In a method for producing filmed representations, the steps comprising separately generating imagery in light beams from different ones of two projectors wherein said light imagery from one of said projectors and a preponderant part of the light imagery from the other of said projectors are modulated for contrast with respect to each other while a remaining part of said light imagery from said other of said projectors is maintained effectively unmodulated, projecting said modulated light beams so as to apply said imagery thereof upon a viewing platen, and optically sighting separately said imagery on said platen in a contrasting manner complementing said light imagery modulations so as to facilitate observation of a stereoscopic model, including projecting said unmodulated light imagery from said other of said projectors on a sequence of contiguous limited areas of a light sensitive photographic film while obscuring from said limited areas said light imagery from the said one of said projectors.

2. The method of claim 1 wherein a polarizing filtering of said light beams effectuates said modulation of said light imageries.

3. The method of claim 1 wherein an anaglyphic filtering of said light beams effectuates said modulation of said light imageries.

4. In a method for producing filmed representations, the steps comprising separately projecting imagery in light from respective ones of two projectors wherein said projectors alternately present said imageries in light therefrom on a viewing platen and binocularly viewing said imageries in light on said platen by sighting thereon with one eye and then the other alternately in correspondence with said alternating imagery presentation so as to facilitate observation of a stereoscopic model, additionally projecting light imagery in said imagery of light from one of said projectors, in an approximately continuous manner on a sequence of contiguous limited areas of a light sensitive photographic film while obscuring from said limited areas said light imagery projected from the other of said projectors then viewable on said platen.

5. A method for producing orthorepresentations, the steps comprising separately projecting imagery in light from respective ones of two projectors wherein said projectors alternately present said imageries in light therefrom on a viewing platen and binocularly viewing said imageries in light on said platen by sighting thereon with one eye and then the other alternately in correspondence with said alternating imagery presentation so as to facilitate observation of a stereoscopic model having an identifiable datum plane at a predetermined level therein, and additionally projecting light imagery in said imagery of light from one of said projectors, in an approximately continuous manner, on a sequence of continuous limited areas of light sensitive photographic film while obscuring from said limited areas said light imagery projected from the other of said projectors then viewable on said platen, and maintaining a uniformly constant spacial relationship between the plane of the film and said viewable datum plane.

6. Orthophotoscope instrumentation comprising apparatus for producing stereoscopic imagery by projected light, devices for facilitating observation of said imagery as a stereoscopic model, and mechanism for recording said imagery as an orthorepresentation, said mechanism comprising light sensitive recording means responsive to exposure to said imagery, a first displaceable light masking means superimposed on a major part of said light sensitive recording means, a second displaceable light masking means superimposed on a minor part of said light sensitive recording means, said devices including means made integral with said second displaceable light masking means and having first and second facilities for displaying by reflection imagery of said projected light permitting exposure to said light of a part of said light sensitive recording means outside of said major and minor parts, respectively, means facilitating displacement of said first masking means in a first coordinate direction in a predetermined plane, means facilitating displacement of said second masking means together with said integral means thereof in a second coordinate direction in said predetermined plane, a third displaceable means constituting a support base for said light sensitive recording means and said first and second masking means, means facilitating displacement of said displaceable base together with said means supported thereon in a further coordinate direction perpendicular to said predetermined plane, said apparatus comprising a plurality of imagery by light projecting arrangements producing said light imagery on said first and second facilities, means in a first of said plurality of projector arrangements to alternately permit and prevent projection of imagery by light on said first facility in a first uniform and continuing sequence, and means in a second of said plurality of projector arrangements to alternately permit and prevent projection of imagery by light on said first facility in a second uniform and continuing sequence, wherein said first and second sequences are totally out of phase and one of said sequencing means is further substantially effective to continuously allow production of imagery by projected light to fall on said second facility, and said devices being operable to permit observation of said imagery on said first facility when said several displacement facilitating means of said mechanism are operable to displace said facilities whereby contiguous parts of said light sensitive recording means are systematically exposed to imagery by light and records an orthorepresentation thereon.

7. The orthophotoscope instrumentation of claim 6 wherein said means effecting said first sequencing comprises means for substantially continuously allowing projection of imagery by light by said first projector on said second facility, said second projector having cooperatively connected therewith means continuously preventing projection of imagery by light therefrom on said second facility, and said several displacement facilitating means of said mechanism are selectively operable, in cooperation with said devices for observing said stereoscopic model on said first facility, to displace said second facility in coordinated directions with respect to said apparatus while effectuating said recording of an orthorepresentation on said light sensitive recording means.

8. The orthophotoscope instrumentation of claim 7 wherein said first and second displaceable light masking means are interconnected pairs of flexible opaque screens and said first facility is a surface of a platen integrally connected with one of said pairs of screens, and said second facility is a relatively narrow slot in said surface.

9. The orthophotoscope instrumentation of claim 8 wherein each of said first and second projector light sequencing means is a cylindrical shutter having light obscuring blades interspersed with light transmitting spaces and said one sequencing means substantially continuously allowing projection of light comprising circumferential slits in said light obscuring blades thereof, and said means for continuously preventing projection of said light of said second of said plurality of projectors is an extensible string attached at opposite ends to said second projector and one end of said platen surface slot.

10. The orthophotoscope instrumentation of claim 6 wherein said first of said plurality of projector arrangements comprises a first part including a diapositive mounting means and a projection lens means, and a second part arranged to illuminate said first part means, and said second part including a lamp section and a condenser lens section separated by a further section comprising said first light sequencing means.

11. The orthophotoscope instrumentation of claim 6 wherein said first of said plurality of projector arrangements comprises a first part including a diapositive mounting means and a projection lens means, and a second part arranged to illuminate said first part means, and a further part including a light passage channel connected to said second part and movable therewith in response to displacements of said second part by said means having first and second facilities, and said channel having secured thereto said first light sequencing means whereby displacements of said first and second facilities cause said light sequencing means to follow along therewith in position to interrupt light from said channel to said first and second facilities.

12. The orthophotoscope instrumentation of claim 8 wherein said first projector light sequencing means is a cylindrical shutter having light obscuring blades interspersed with light transmitting spaces and means for substantially continuously allowing projection of light are circumferential slits in said light obscuring blades, said second of said plurality of projectors comprises a first part including a diapositive mounting means and a projection lens means, and a second part arranged to illuminate said first part means, and said second part including a condenser lens section and a lamp section separated by a further section comprising said first light sequencing means, and said means for continuously preventing projection of said light of said second projector is a bar suspended from said condenser lens section so as to span across the optical axis of the lens thereof.

13. The orthophotoscope instrumentation of claim 6 wherein said second of said plurality of projector arrangements comprises a first part including a diapositive mounting means, a projection lens means, and a light reflector means adapted to direct light radiated thereon through a diapositive in said mounting means therefor, and said projection lens means, and further comprises a second part disposed to illuminate said light reflector means, said second part includes an enclosure housing having a base structure adjustably mounted therein, said base structure having secured thereon a lamp and said second light imagery sequencing means interposing spaced light interrupting elements thereof between said lamp and said light reflecting means.

14. The orthophotoscope instrumentation of claim 13 wherein a clamping mount is maintained adjustably supported on said base structure, said mount having secured therein a motor positioning a shaft thereof adjacent said lamp, and said light interrupting elements being disposed to form a circular pattern about a central shaft therefor having means connected to said motor shaft.

15. Orthophotoscope instrumentation having stereoscopic image producing apparatus comprising dual projectors individually fitted with a different one of a stereopair of recorded imagery, a light reflective platen panel displaceable over a light sensitive recording surface, said panel having a relatively small aperture therein which opens on to said recording surface, and viewing means adapted to facilitate observation of said panel by an operator of said instrumentation, each of said projectors having, respectively, individual distinguishable light differentiating means therein for generating contrasting modulated light imagery of said stereopair, and further light differentiating means in said viewing means which upon application of said projected light imagery to said platen panel enables a presentation for observation at said viewing means of a stereoscopic model of said recorded imagery, said light differentiating means of one of said projectors having a part thereof adapted to modulate a preponderant portion of said light imagery projected from the said one of said projectors on to said platen panels, and another part thereof facilitating the projection from the said one of said projectors of effectively unmodulated light imagery on to said platen panel aperture during displacement of said platen panel, and light masking means attached to said other of said projectors and maintained disposed thereby with respect to said platen panel during displacements thereof for preventing application of light imagery from said other of said projectors to said platen panel aperture whereby a sequence of contiguous limited areas of said recording surface is exposed to said unmodulated light imagery and precluded from exposure by said modulated light imagery.

16. The instrumentation of claim 15 wherein said individual distinguishable light differentiating means and said further light differentiating means include complementary sets of light modulating filters.

17. The instrumentation of claim 16 wherein said another part of said light differentiating means of said one of said projectors is an optically clear passage through a relatively small area of a light modulating filter of one set of said sets of filters.

18. The instrumentation of claim 16 wherein said optically clear passage is a slot in said light modulating filter of one set of said sets of filters.

19. In an orthophotoscope instrumentation wherein dual projection means, serving to project a stereopair set up therein, have in each such means a light source adapted to impart separately respective recorded imageries of said stereopair to a light reflecting panel portion of a platen which is displaceable over a light sensitive recording surface so as to mask light therefrom, means operatively associated with said platen which is adapted in response to displacements thereof to maintain masked from light all of said recording surface not masked by said platen, said panel having a relatively small aperture therein which opens on to said recording surface, a pair of light modulating means operatively associated separately with respective ones of said light sources further adapting said dual means to project said recorded imageries by way of lights which are modulated for contrast with respect to each other, and one of said operatively associated light modulating means having a part thereof adapted to allow effectively unmodulated light from said light source thereof to effect a concurrent projection of a part of said related imagery upon said platen panel aperture during displacements of said platen, and self-adjusting, flexible linkage means coupling said platen to said light source of said light affected by said part allowing projection with unmodulated light such that displacements of said platen operate to regulate dispositions of said connected light source whereby there is maintained a fixed positional correspondence between said imagery projected with unmodulated light and said panel aperture.

20. In the orthophotoscope instrumentation of claim 19 wherein said coupling of said light source to said platen includes an adjustable arm of said linkage means which further comprises a rounded riser affixed in said platen, means adapting said arm to direct displacements of said light source in accordance with translations of said platen, said arm adapting means including a member secured to said arm and having affixed to a dependent end thereof a bearing element, and extensible means, connected to said platen and displaceable in said arm member, adapted to retain said bearing element in contact with said riser and restrain the excursions of said arm in the course of said adjustment thereof to pivotal movements about a point in a plane of said recording surface.

21. In the orthophotoscope instrumentation of claim 20 wherein said arm member houses pulleys adapted thereby to rotate in differently disposed planes, and said extensible means including a set of lines which are individually anchored to said platen, about said riser affixed therein, and acting on respective ones of said pulleys, said lines each having a tensioned spring connected therein whereby pivotal movements of said arm affect changes in the lengths of said lines with changes in said spring tensions.

22. In the orthophotoscope instrumentation of claim 21 wherein said riser projects from said platen as a surface of a spherical sector of a sphere having a center thereof in the plane of said recording surface, and said bearing element comprising a contacting surface having a curvature conforming to said spherical sector surface.

* * * * *